(12) United States Patent
Redpath et al.

(10) Patent No.: US 9,397,520 B2
(45) Date of Patent: Jul. 19, 2016

(54) INTELLIGENT ADAPTIVE POWER SUPPLY

(71) Applicant: Sensormatic Electronics, LLC, Boca Raton, FL (US)

(72) Inventors: George Redpath, Lisburn (GB); Thomas Naughton, Groton (MA); Robert Budd, Beverly, MA (US); Mark McMaster, Concord, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 674 days.

(21) Appl. No.: 13/715,389

(22) Filed: Dec. 14, 2012

(65) Prior Publication Data

US 2014/0167503 A1 Jun. 19, 2014

(51) Int. Cl.
*H02J 1/04* (2006.01)
*H02J 9/06* (2006.01)
*G05F 1/00* (2006.01)
*H02J 3/00* (2006.01)

(52) U.S. Cl.
CPC ... *H02J 9/06* (2013.01); *G05F 1/00* (2013.01); *H02J 3/00* (2013.01); *Y10T 307/344* (2015.04); *Y10T 307/469* (2015.04)

(58) Field of Classification Search
USPC .......................................................... 307/35
See application file for complete search history.

(56) References Cited

U.S. PATENT DOCUMENTS

| | | | | |
|---|---|---|---|---|
| 2,275,882 | A * | 3/1942 | Bany | 361/59 |
| 6,791,853 | B2 * | 9/2004 | Afzal et al. | 363/142 |
| 7,629,712 | B2 * | 12/2009 | Nakashima et al. | 307/126 |
| 7,996,115 | B2 * | 8/2011 | Nickerson et al. | 700/284 |
| 8,178,996 | B2 * | 5/2012 | Kuno et al. | 307/28 |
| 8,917,513 | B1 * | 12/2014 | Hazzard | 361/724 |
| 2004/0148060 | A1 | 7/2004 | Lee | |
| 2005/0052164 | A1 * | 3/2005 | Sakai et al. | 323/222 |
| 2008/0238488 | A1 * | 10/2008 | Comisky | G01R 31/40 327/20 |
| 2010/0127568 | A1 * | 5/2010 | Ng | H02J 1/14 307/32 |
| 2010/0127678 | A1 | 5/2010 | Inatomi et al. | |
| 2010/0321839 | A1 * | 12/2010 | Chang | H02P 29/028 361/52 |
| 2011/0148197 | A1 | 6/2011 | Hernandez et al. | |
| 2011/0307910 | A1 | 12/2011 | Nagasato et al. | |
| 2011/0320834 | A1 * | 12/2011 | Ingels | G06F 1/266 713/310 |
| 2012/0193987 | A1 * | 8/2012 | Siglock | 307/64 |
| 2013/0268812 | A1 * | 10/2013 | Liu | G05B 13/02 714/57 |
| 2013/0279097 | A1 * | 10/2013 | Jacobi | 361/679.01 |
| 2014/0078407 | A1 * | 3/2014 | Green et al. | 348/836 |
| 2014/0084792 | A1 * | 3/2014 | Oh | H05B 37/02 315/120 |
| 2014/0129856 | A1 * | 5/2014 | Bertin | G06F 1/325 713/320 |
| 2014/0167503 | A1 * | 6/2014 | Redpath et al. | 307/23 |

FOREIGN PATENT DOCUMENTS

EP 2 333 931 A2 6/2011
JP 2000-322133 A 11/2000

OTHER PUBLICATIONS

Extended European Search Report, mailed on Dec. 4, 2014, from counterpart European Application No. 13197007.1, filed on Dec. 12, 2013.

* cited by examiner

*Primary Examiner* — Ronald W Leja
(74) *Attorney, Agent, or Firm* — HoustonHogle, LLP

(57) ABSTRACT

A multi-output power supply comprises an input power port for receiving input power, a first output power port supplying a first voltage derived from the input power, a second output power port supplying a second voltage derived from the input power, and a shut-down circuit configured to shut down the first output power port, independently of the second output power port, if power drawn from the first output power port exceeds a first predetermined value.

20 Claims, 8 Drawing Sheets

INTELLIGENT ADAPTIVE POWER SUPPLY

BACKGROUND OF THE INVENTION

A typical access control system includes card readers and proximity readers, usually located near an access point such as a door that provides controlled access to or exit from a limited access area. Signals from the card readers and proximity readers are forwarded to a control panel which in turn controls door locks.

Typically, panels, card readers and proximity detectors require 12 volts. Some door locks require 12 volts for operation while others may require 24 volts. Systems may include both 12-volt and 24-volt locks. To be able to support all devices, multiple power supplies are needed to provide the various voltages. Each power supply will likely have excessive ratings because it is unknown how much current/power is going to be needed from each voltage source. Where the system is battery-backed, a different battery is needed for each voltage to be supplied.

Further, the power supplies (12-volt and 24-volt) are unmanaged, potentially resulting in unplanned loss of power and unpredictable performance. This makes scheduled maintenance extremely difficult, and may result in unnecessary and unscheduled maintenance.

BRIEF SUMMARY OF THE INVENTION

Lack of communication to the power supply of load requirements may result in unpredictable performance. Also, the fixed nature of the power distribution from multiple power supplies often results in over-specification of the supplies, as well as an inability to adapt to the requirements of the particular access-control application. Furthermore, the need for multiple battery packs results in more complex maintenance. Due to the inefficient nature of the output stage of the power supplies, larger battery packs are required.

A power supply according to an embodiment of the present invention comprises an advanced, low-voltage, battery-backed power supply for use in an installation with one or more doors. The power supply can be powered by most known AC power systems, and delivers uninterrupted power when the AC input fails. Use of the recommended batteries and configuration (e.g., 8-doors) guarantees the specified time of power delivery and battery recharge.

In an embodiment, a power supply provides 12V and 24V power outputs for powering door locks; and a third power output delivering 12V for powering 12V peripherals and/or panels and control circuitry. Each of the three power outputs can be monitored and shut down independently of the other outputs. Of course, other power supplies according to the invention may provide more or less than three power outputs at various voltages.

According to one aspect of the invention, a single power supply provides multiple outputs at multiple voltages to share power. Each output may be programmed to allocate up to a certain power limit. The power supply provides monitoring capability. For example, the power supply may provide a web page through which a user or administrator communicates directly with the power supply via a web interface/browser; or the power supply may provide an interface to a control panel which the user or administrator can access. Individual outputs can be independently turned on and off.

A log of notable events (i.e., overcurrent, voltage out of spec, AC power lost/restored, etc.) may be maintained by the power supply for inspection by a user or administrator or for later analysis. Analysis of the log information can be used to tune the power supply, or reallocate power.

Peripheral devices may become locked out such that the only way to recover is to recycle power. Since the peripherals are on separate outputs, one group may be recycled while the rest of the system remains powered and operational. Recycling may be performed manually, or automatically. For example, if the control panel has stopped receiving communications from equipment such as card readers and door locks, it can command the power supply to recycle the pertinent power output—this may be done automatically from the panel or from a user terminal, display or computer, such as a C•CURE® workstation.

Automatic disconnect: Upon detection of an overcurrent event, the power supply may be automatically disconnected. Optionally, it may attempt to reconnect up to n times, for some predetermined or preprogrammed number n. After n failed attempts, an alarm may be generated and centrally reported to, for example, a CCURE 9000 workstation.

Learning algorithm: Over time, the power supply may determine where power is actually allocated. The power supply might indicate how much spare overhead is left to make it easier for installers. For example, the power supply could observe that over the last 20 days, peak current was x amperes, so therefore y amperes are still available; or that 120 watts are being consumed, so that an additional 30 watts are still available.

Battery backup: The state of the backup battery may be monitored during charge/discharge, and reported.

Battery replacement schedule: The power supply may provide a message on a predetermined date and/or if a battery is determined to be faulty. When it is time to replace a battery, the power supply can electrically disconnect the battery to be replaced from the system while the power supply is running—that is, the power supply does not need to be shut down.

An embodiment of the invention comprises an intelligent dual output power supply with the ability to dynamically allocate power across the two voltage rails. The power supply works based both upon feedback from connected devices, and by monitoring the current draw of the connected load. This results in a simple installation, with better monitoring and improved efficiency.

DETAILED DESCRIPTION

Figure 1:
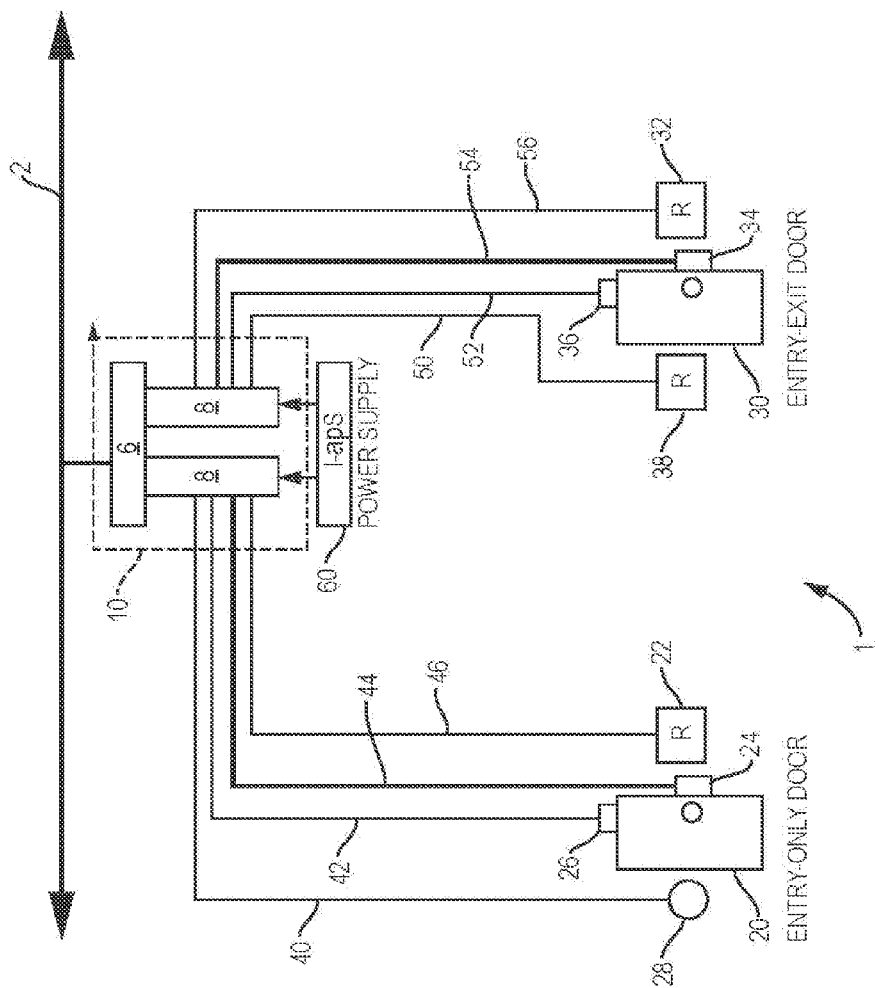
FIG. 1 is a schematic diagram illustrating an exemplary access control system employing an embodiment of the present invention.

FIG. 1 is a schematic diagram illustrating an exemplary access control system 1 employing an embodiment of the present invention.

An access control system may include, for example, one, two or more controlled doors, (e.g., doors, turnstiles, gates, vehicle barriers, etc.). For example, the system shown in FIG. 1 has two doors 20, 30. Door 20 is an entry-only door (i.e., requiring authorization before permitting entry) and is associated with card reader 22 such as a Wiegand reader, powered door lock 24, door sensor 26 and exit sensor 28. The second door 30 in this example is an entry-exit door 30, and may be associated with two card readers (an entry reader 32 located outside the restricted area and an exit reader 38 located inside the restricted area). It would be understood that generally an access control system may comprise any number of doors in various combinations of entry-only, exit-only and combined entry-exit doors and that the system of FIG. 1 is simply for illustrative purposes.

At the heart of the system is a control panel 10. The control panel 10 may comprise a general controller module (GCM) 6 and two access control modules (ACMs) 8. The ACMs are controlled by the GCM 6 and each ACM 8 controls one of the doors 20, 30. The GCM may comprise a processor running an operating system, with memory, and network and communication ports. The GCM also supports one or more ACMs. It would be understand that the GCM and ACMs do not need to be physically separate devices.

The GCM may communicate with other external systems and/or monitoring services over a network 2. A power supply 60 provides power to the control panel 10. The control panel 10 provides power to and communicates with the doors (i.e., locks, readers and other associated sensors) through various cabling. For example, card reader 22 communicates with control panel 10 via cable 46; door lock 24 is powered via cable 44; and sensors 26 and 28 communicate with control panel 10 via cables 42 and 40 respectively. Similarly, card readers 26 and 38 communicate with control panel 10 via cables 56 and 50 respectively; door lock 34 is powered via cable 54; and sensor 36 communicates with control panel 10 via cable 52.

Figure 2:
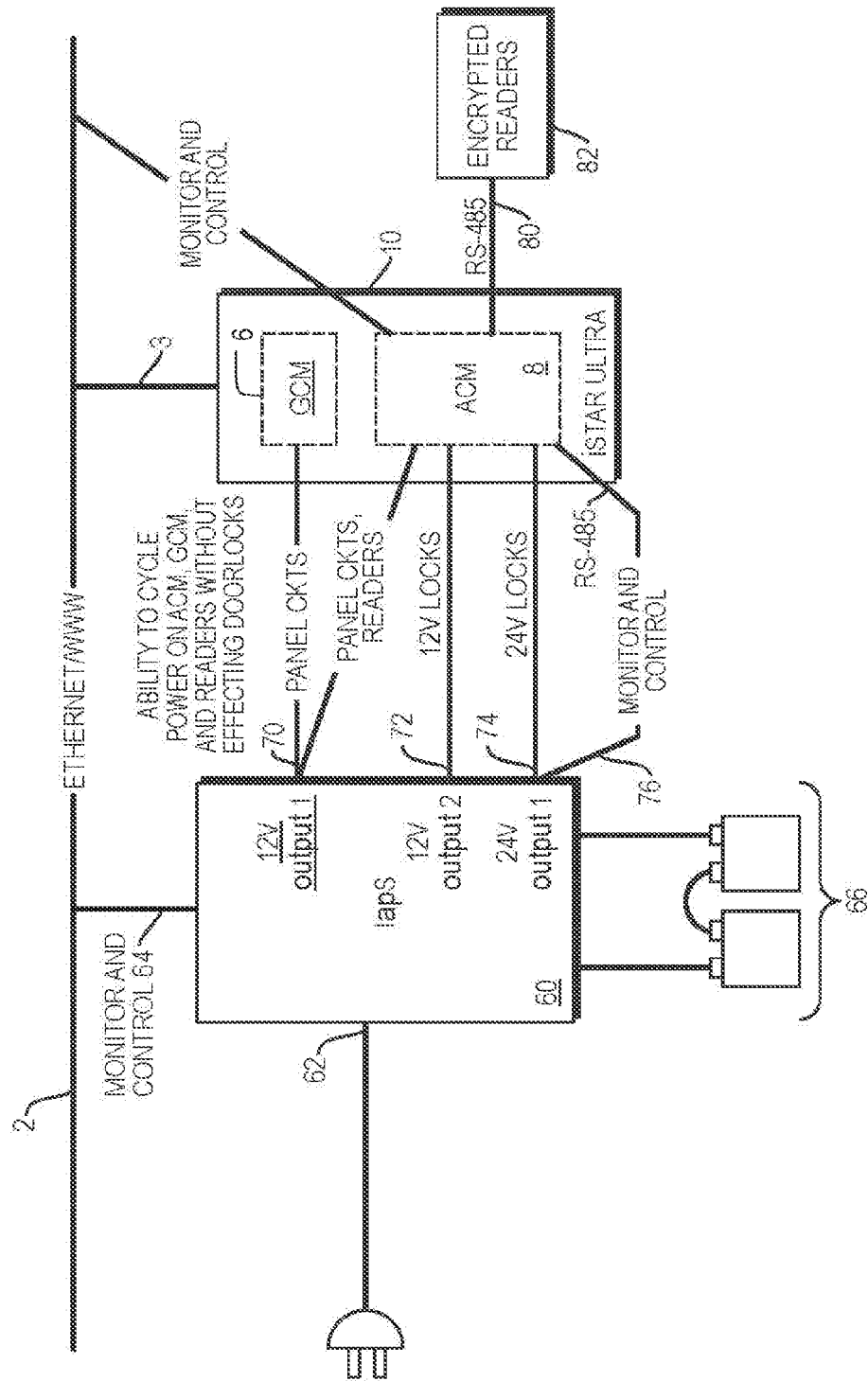
FIG. 2 is a schematic diagram illustrating further details of the access control system of FIG. 1.

FIG. 2 is a schematic diagram further detailing portions of the access control system of FIG. 1. Input power is provided at input power port 62. Input power may be, for example, nominally 120 volts AC at 60 Hz or some other standard or non-standard power. The power supply 60 may convert the input power into three distinct output power ports, providing 12 volts at output 1 (70) to power the panel 10 circuits, for example the GCM 6 and ACMs 8, as well as the readers 82 (corresponding to readers 22, 32, 38 of FIG. 1). A second 12-volt output power port 72 provides power for locks operating at 12 volts. A third output power port 74 provides 24 volts for power locks that require 24 volts for operation. Each of these outputs may have very different power draw requirements. Further, upon failure of any one of the three power outputs (due to internal failure or a short circuit, for example), the non-failing outputs are capable of continuing to provide power to maintain the locks or circuits.

In the example of FIG. 2, the power supply 60 and the istar® ULTRA™ control panel 10 are each independently capable of communicating over network 2.

A backup battery bank 66 comprises one or more backup batteries. Here two 12-volt batteries are connected in series to provide 24 volts. This single 24-volt backup supply provides backup for all three output ports, i.e., both the 24-volt and 12-volt output ports, as described later.

Figure 3:
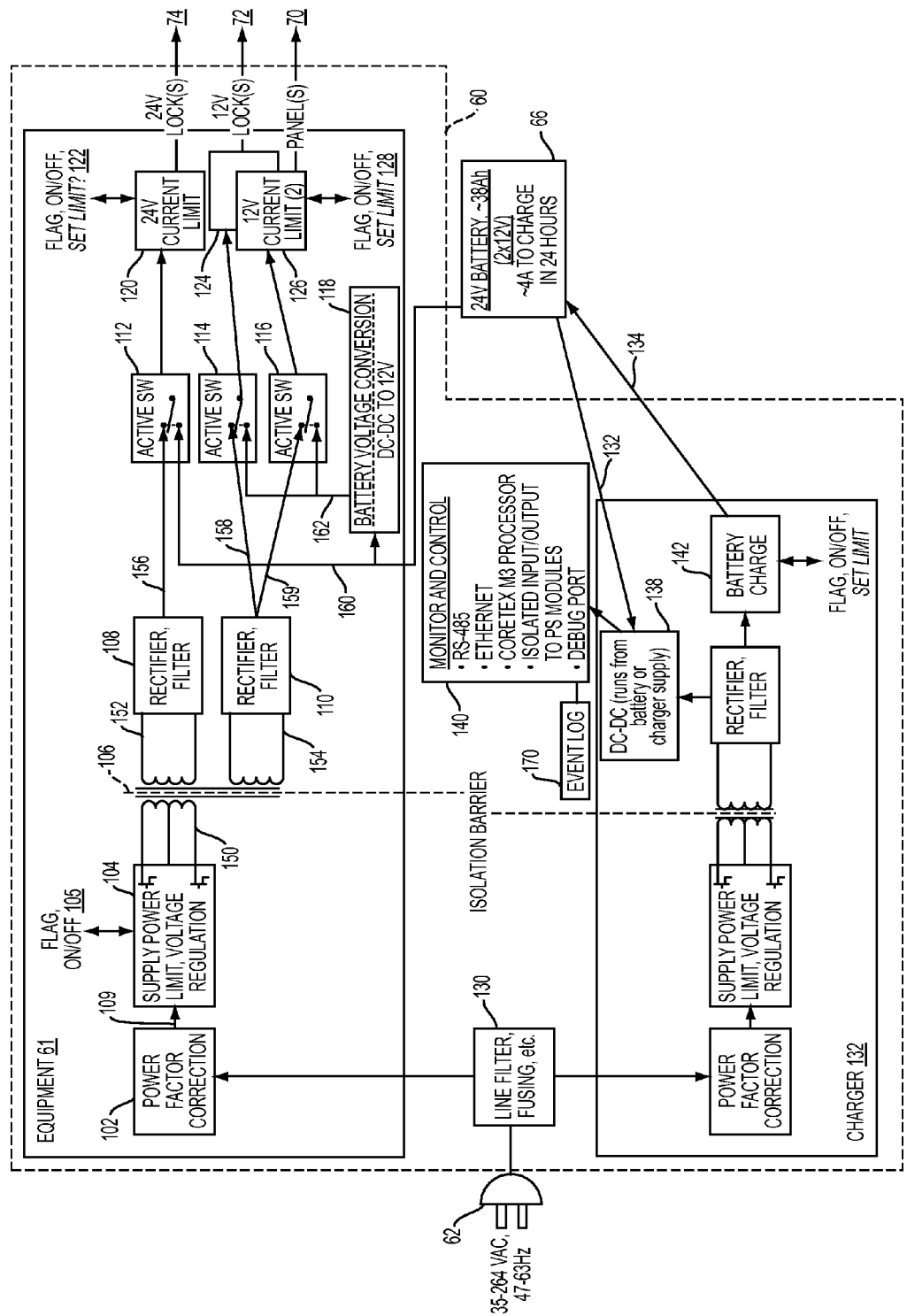
FIG. 3 is a schematic diagram of a power supply as employed in the system of FIGS. 1 and 2.

FIG. 3 is a schematic diagram of a power supply 60 as employed in the system of FIGS. 1 and 2. The power supply 60 receives input or line power at 62, and includes a line filter and fusing 130, a charging circuit 132 for charging the backup batteries 66, an equipment power block 61 for converting input power to the desired output voltages and providing power to the control panel. The power supply may also include a monitor and control section 140 to monitor and control aspects of the power supply. The battery pack 66 is shown separately but could be integrated with the power supply 60.

Due to the typical behavior of switching power supplies tied to AC sources (being that they draw current discontinuously), a power factor correction (PFC) unit 102 stores energy at a high DC voltage such that the current drawn by the supply is nearly constant. The PFC 102 can shut down all access control outputs during an overcurrent event.

The PFC output 109 is fed to a Supply Power Limit Voltage Regulation circuit 104 which feeds a high-frequency (for example, ~100 kHz) power 150 to transformer 106. Separate 24VAC and 12VAC outputs (respectively 152, 154) are rectified by rectifier/filters 108 and 110 respectively. The rectified 24 VDC output 156 is one of two power inputs to switch 112. The other input to switch 112 is the battery backup supply 160. Normally, if commercial power 62 is available and the PFC 102 is operating correctly, the switch will pass the rectified 24 VDC 156 to a 24V current limiting circuit 120. A signal 105 may be provided to indicate whether the PFC is operating or not.

The current limiting circuit 120 holds a set point in non-volatile storage (alternatively, the set point may be held externally and communicated to the current limiting circuit). For example, a microcontroller (in block 140) may have a non-volatile digital potentiometer to set and hold the current limit. This non-volatile digital potentiometer can maintain current settings until reprogrammed by the microcontroller.

The power supply circuitry also includes an output current limiting circuit (120, 124, 126) that delivers a programmable maximum current. The circuit controls overcurrent by disconnecting the terminal (output) voltage supplied to the load device after approximately one second. When the overcurrent occurs, a timer may be started wherein the output is immediately disconnected if the overcurrent is above a programmable limit. In part, this is to accommodate loads (e.g., door locks) that are primarily resistive with an inductive surge. A time limit is preferably placed on this process, because generally if a lock takes a long to move, that is more likely due to a genuine fault, and could cause the current limiting circuit to fail. Terminal voltage may also be monitored so that if the terminal voltage drops below a threshold the event is recorded. The power supply may also inform the control panel 10 of an overcurrent event to help prevent damage to the controlling equipment from such an event, such that the offending device(s) may be selectively disconnected.

Figure 4:
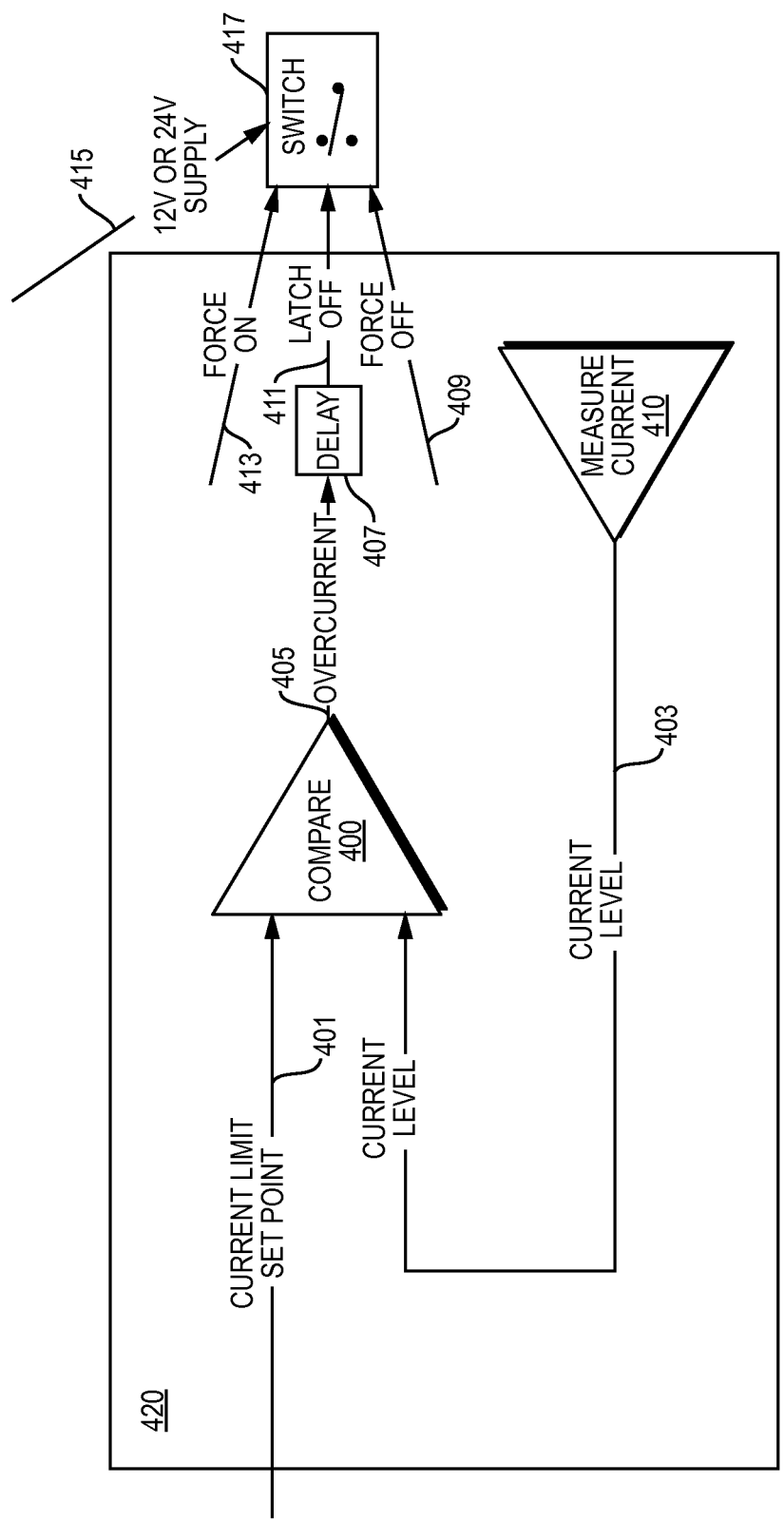
FIG. 4 is a schematic diagram of a monitoring and switching circuit as employed in an embodiment of the invention.

FIG. 4 is a schematic diagram of a monitoring and switching circuit (or current limiting circuit) 420 as employed in an embodiment of the invention. The monitoring and switching circuit may 420 correspond with any of current limiting circuits 120, 124 or 126 of FIG. 3, and may include a current-to-voltage amplifier 410 with an input resistor (not shown) to measure output current. Alternatively, the current draw can be measured/monitored using an analog-to-digital converter (ADC). A comparator 400 compares the current draw indication (or converted voltage) 403 with a set point 401, and the comparator output 405 drives a delay circuit (for example, an RC delay circuit) 407 to delay a hardware shutdown when the output current exceeds the set point.

The time delay may be, for example, one second, such that transient events (of a relatively short interval) do not cause latching of the output in the off state. If the set point is still exceeded beyond the delay period, the output is turned off and held off by a latch 417.

Further, the comparator output may signal the overcurrent event to the microcontroller.

Referring back to FIG. 3, rectifier/filter 110 provides two 12VDC outputs 158, 159, that are fed respectively to switches 114 and 116. Switches 114 and 116 behave in similar fashion to switch 112 discussed above, with the exception that the second input to each switch is a 12 VDC output 162 from battery voltage conversion circuit 118, which converts the battery backup voltage 160 from 24VDC to 12VDC. In this example, the output of switch 114 feeds a 12 V current limit circuit 124 and switch 116 feeds 12V current limit circuit 126. The current limit circuits 124, 126 behave similarly to the 24V current limit circuit 120 described previously. Current limit circuit 124 provides power to 12V locks while current limit circuit 126 provides power to the panel (and other equipment). Because of the different requirements of the locks and panels, and because it is desirable for the locks to continue to operate in the event of a panel failure and vice versa, each current limiting circuit 124, 126 has its own set point, and the circuits operate independently of each other.

The current limit circuits 120, 124, 126 provide indication signals such as representative signals 122, 128 to the microcontroller to indicate whether power is on or off, or whether a limit has been set, for the respective power outputs 74, 72, 70.

A charging circuit 132, which may or may not be a separate unit from the power supply 60, provides battery charge power 134 to the backup battery 66. The monitor and control unit 140 may set the charge current via a non-volatile digital potentiometer (not shown). The charge current may be monitored. For example, the monitor and control unit may measure the charge current with an ADC, and cycle the circuit on and off when the charge current exceeds the set point. An output flag (not shown) may indicate overcurrent.

The backup battery voltage may be monitored. For example, to derive battery life the monitor and control unit may measure the battery voltage under load when input AC power 62 is absent to prevent deep discharge or to determine whether the battery is present.

A DC-DC converter 138 derives power from line power (stepped down) or from the backup battery to supply the appropriate power for the monitor and control unit 140.

The Monitor and Control unit (MCU) 140 provides several functions, such as RS-232, RS-485 and Ethernet interfaces, a microcontroller, and various I/O control and monitor signals 105, 122, 128, etc. to the power supply 60.

Secure (authenticated and encrypted) communications may be provided for monitoring and control of the power supply as part of an integrated access control solution.

The power supply MCU 140 may monitor and control the charging current to account for different battery capacities and technologies. For example, while the power supply is online and connected to a central database, new and different charging profiles can be loaded into the power supply. Thus, a larger battery pack can be charged either more slowly, or if the aim is to provide less current over a longer time, the parameters can be adjusted accordingly. Further, batteries from different manufacturers may have differing charging profiles. As well, batteries with differing chemistries such as Lithium-ion may be charged by the same controller, without a technician having to visit the site to make changes.

The power supply may also monitor and control the power supply current limits for the multiple output voltages, as well as AC power loss and battery-backed operation.

The power supply includes a multi-chemistry battery charge current limiting circuit 142 that provides efficient charging of batteries having various chemistries. The power supply monitors the current drawn, and by use of a controllable constant current source, can limit the current drawn by the battery. While this may change the time to charge the battery, the charge current can be adaptive to match the load drawn on the outputs. This ensures that the maximum rated output current of the power supply is maintained irrespective of the charge state of the batteries. The battery charge current limiting circuit 142 may deliver a programmable maximum charge current in the initial phase of battery charging; monitors the battery voltage to determine the charge state of the battery; and based upon the battery voltage, reduce the charge current as the battery reaches the "topping off" and "float" stages.

The power supply further allows the control panel to retry and otherwise manage an overcurrent event. For example, retry algorithms can automatically restore and maintain system operation. In addition, output prioritization can be employed where lower priority devices are shut down to maintain operation of high priority devices. For example, locks can be prioritized such that those with lower priority are disconnected by installing lower priority locks on a different output than those with higher priority. For example, it may be preferable to drop access control to a computer room last, but allow free access on turnstiles.

An embodiment of the multi-output supply can simultaneously operate and monitor both 12V and 24V devices, and dynamically allocate power to these devices.

When AC power is lost, the power supply uses an active circuit to switch to a battery-generated supply. The power supply informs the system power has been lost, by sending an alarm signal for example, to the GCM and/or the central monitoring station. The power supply further monitors the battery to prevent deep discharge.

Most power conversion and distribution functions of the uninterruptable power supply are handled directly through hardware, without processor intervention. However, battery charging may be entirely under processor control. The processor may also monitor the status of the power supply inputs and outputs and reporting of events, as well as a limited amount of other control functionality, such as turning on or off individual power outputs and setting maximum current limits on the power outputs.

The power supply may be monitored and configured through a simple menu-based system via, for example, an RS-232, USB or other serial "debug" port (shown within the monitor and control unit 140). Reports of events, alarms and warnings may be sent from the debug port as they occur. A listing of logged events 170 may be maintained and made accessible via the debug port. Firmware download through the debug port may be supported through a simple file transfer protocol such as Kermit or XModem. The debug port may also provide basic development and field debug capability.

The power supply may also communicate directly with a host such as a CCURE 9000 workstation or a remote web client, or the power supply may communicate with the access control panel 10 via an RS-485 connection/protocol, and the panel in turn may report the power supply status and alarms to the host.

Alternatively, or in addition to the above, the power supply may communicate with the control panel via Ethernet on a private network, or to a PC or other computing device via a webserver provided on the power supply. For example, a secure webserver may be implemented that allows the setting of system parameters and monitoring system states via a remote web browser.

The processor (shown within the monitor and control unit 140) may be a microcontroller with an ARM core. Instructions (firmware code) for running the processor may reside entirely in FLASH memory within the microcontroller. The microcontroller may have FLASH memory for storage of code, parameters, backup, etc. The firmware may be upgradeable in the field. The firmware RAM, including stacks, local and global variables, and databases (if present) may reside entirely or partially within, or completely outside, the microcontroller. The microcontroller may access an external mass storage memory chip (EEPROM, FLASH, etc.) via a standard serial protocol (SPI, I2C, etc.), for potential future storage of large data files, such as web pages, etc.

Tri-color LEDs on the power supply front panel may provide indications. For example: overall system status; status for each of the three power outputs; battery charger status; RS-485 port status; and Ethernet port status. For each tri-color LED, amber can be achieved by activating red and green simultaneously, or by activating them alternately. A System Status LED shines RED to indicate a System Fault such as when PFC Overcurrent Shutdown is active or Total Power Exceeds Maximum Limit is active. YELLOW indicates the system is running on batteries: that is, AC presence is not detected or the Battery Test Active is active. GREEN indicates that conditions are normal.

Output Status LEDs may be provided for each power output. RED indicates that the corresponding power output has been shut down. YELLOW indicates that the output is trying to be re-established. GREEN indicates that the output is active, i.e., delivering or capable of delivering power.

An RS-485 Status LED shines GREEN to indicate that the RS-485 port is communicating with a host or with the panel. YELLOW indicates that the RS-485 port is acquiring a link. RED indicates that the RS-485 port is offline.

Similarly, an Ethernet Status LED shines GREEN to indicate that the Ethernet port is online. YELLOW indicates that the Ethernet port is acquiring a network address. RED indicates that the Ethernet port is offline.

A Battery Charger Status LED may shine GREEN to indicate that the battery is fully charged and in float stage. YELLOW indicates that the battery is charging in topping stage. YELLOW Flashing indicates that the battery is charging and is in the boost stage. RED indicates a battery/charger fault. OFF indicates that there is no battery.

An Enclosure Status indicator light may be provided to indicate whether the unit is powered while the enclosure door is closed without light pipes or other methods that would increase costs. For example, a superbright LED may be utilized, which output is optically attenuated by a window in the enclosure door. The Enclosure Status LED may electronically dim when the enclosure door has been opened (detected by a tamper switch), so as not to be blinding. If this LED is OFF, attention is required. FLASHING indicates a problem or fault, for example a Power Factor Correction Overcurrent Shutdown is active or Total Power has exceeded the Maximum Limit. ON indicates that the status is good. Two controls can be used to activate this LED through two different load resistors, so that three brightness levels (plus off) can be attained. An internal timer may be used to flash any of the LEDs, for example at a rate of 2 Hz.

Several power monitoring signals may be made available to the microcontroller. For example, an AC Power Present signal 105 indicates whether AC power is present on the power input. Additionally, the output of the circuitry that limits Power Output current will be monitored, to determine if the circuitry is actively limiting the current (122, 128, "Flag").

Each of the power output currents may be monitored by an analog-to-digital (A/D) converter connected to the Output Power Current Measurement circuitry. A simple infinite impulse response (IIR) filter may be used to smooth the measured value. Because the Power Output current limiting circuit acts to limit current by switching the Power Output on and off, when the Power Output Current Limit Active input is Active, a longer finite impulse response (FIR) filter may be applied to the power output current measurements.

Each of the output power voltages may be monitored by an A/D converter connected to the Output Power Voltage Measurement circuitry. A simple IIR filter may be used to smooth the measured value. Because the Power Output current limiting circuit acts to limit current by switching the Power Output on and off, when the Power Output Current Limit Active input is Active, a longer FIR filter may be applied to the output power voltage measurements.

The current limit for each Power Output may be set by writing binary values to the power output current limiting circuit. Writing a '0' value may disable the Power Output. The interface may comprise digital potentiometers connected to the processor serial peripheral interface (SPI) port.

The output of the Power Factor Correction circuit can be disconnected from all internal and external circuitry by a switch circuit, under control of the microcontroller. By default, this switch will normally be turned ON upon processor reset.

The output of the circuitry that limits Battery Charger Current may be monitored by the microcontroller to determine if the circuitry is actively limiting current. The Battery Charging Current input may be monitored by an A/D input connected to the Battery Charge Current Measurement circuitry. A filter, such as a simple IIR filter, may be used to smooth the measured value. Because the Battery Charger current limiting circuit acts to limit current by switching the Battery Charger on and off, when the Battery Charger Current Limit Active input is Active, a longer FIR filter may be applied to the Battery Charger Current measurements.

The Battery Terminal Voltage may be monitored by an A/D input connected to the Battery Terminal Voltage Measurement circuitry. Because the Battery Charger current limiting circuit acts to limit current by switching the Battery Charger on and oft when the Battery Charger Current Limit Active input is Active, a longer FIR filter may be applied to the Battery Terminal Voltage measurements.

The current limit for the Battery Charger may be set by writing binary values to the battery charger current limiting circuit. Writing a '0' value may disable the Battery Charger. The interface may comprise digital potentiometers connected to the processor SPI port.

At least one embodiment may include two front panel pushbutton switches, RESET and Shutdown, recessed to prevent accidental activation. Pressing only RESET may reset the microprocessor and existing programmable settings while any event logs and related items may be maintained. Pressing Shutdown for, say, approximately two seconds may disconnect the battery charger output. This facilitates battery replacement. Feedback may be provided to the user via the front panel LEDs. After battery replacement, pressing the shutdown switch for some length of time, for example two seconds, will reconnect the battery. Pressing Shutdown for a different length of time, for example approximately five seconds, may set all output current limits to zero thus shutting down the outputs. The user is provided feedback via the front panel LEDs, i.e. they wait until all outputs are shown as "off". To recover from this situation the power to the unit can be cycled or press RESET for 5 seconds (see 5.1.2).

An event log 170 may be maintained by the power supply for inspection by a user or administrator or for later analysis. Analysis of the log information (i.e., overcurrent, voltage out of spec, AC power lost/restored, etc.) can be used manually (or automatically according to some algorithm) to tune the power supply, i.e., set the operating parameters to match observed conditions, or reallocate power.

The event log may be maintained in external non-volatile memory, such as EEPROM or NAND FLASH. Events can be stored in a transactioned format, and each record will contain at a minimum: A record number, an identifier of the logged state, the state value, and the RTC time of the event, and a checksum for the event record. Events may be stored in ring buffer format so that after the buffer is full the newest event records will over-write the oldest event records. Start and End buffer tokens can be updated each time an event record is added so that proper sequencing of the Event Log may be maintained, even after a processor reset. In order to prevent recording redundant Alarms and Warnings, an Event is recorded after its initial occurrence, and then a running count of reports of the same Event is maintained. The Event will only re-record after a programmable number of additional occurrences or if the Event recurs after a programmable amount of time. Exemplary default settings are 10 occurrences and 10 seconds.

Power Output

A Power Output Servicing function monitors the power outputs reporting the operating states and events of the power outputs. The Power Output Servicing function monitors the current, voltage and power for each power output and may generate event notifications and actions in response to certain conditions.

The current of each power output is measured and used to compute the power output. Average Current and Peak Current for each output are also tracked.

The voltage of each power output is checked to see if it is within tolerance (+/−10% of nominal). If the voltage is more than +/−20% out of tolerance, the Power Output Voltage status is determined to be Out of Tolerance and an alarm condition is set. If the voltage is more than +/−10% out of tolerance (but less than +/−20%), a Power Output Voltage is determined to be Out of Tolerance and a Warning condition is set. Finally, if the voltage is within tolerance, a Power Output Voltage is determined to be normal.

Power for each output is calculated by multiplying voltage by current. Total Power of all outputs is calculated by summing the calculated power of all of the outputs. If Total Power exceeds some threshold, such as 180 watts, a Total Power Output Voltage Out of Tolerance alarm condition is set. If the Total Power exceeds a second threshold, such as 160 watts, but is under the first threshold, a warning condition may be set. If Total Power is below this second threshold, a normal condition is set.

Power Output Current Limit Active represents the state of Power Output Current Limit circuit. When active, the circuit has been disconnected due to an over-current event.

Power Output Control: The Power Output Current Limit value for each power output may be stored in non-volatile memory. At startup or in response to a protocol command, the Power Output Current Limit may be written to the current limiting hardware.

Power outputs may be enabled or disabled individually, either in direct response to a command, in response to activation of a SHUTDOWN panel button, or by an algorithm for timed re-tries for re-enabling power outputs. The access control panel may send commands to the unit to set parameters for the automatic power re-enabling.

The parameters controlling the power output shutdown/retry algorithm are as follows. Default values are provided for illustrative purposes.

Output Shutdown Time (sec): The time that the output will be shutdown before trying to turn it back on. Default: 10 sec.

Output Shutdown Maximum Retries: The maximum number of times the firmware may attempt to turn the output back on. Default 5 retries.

Output Shutdown Offline Time: After the maximum number of retries has been exceeded, the length of time that the output will remain shut down before attempting to begin retries. Default 10 minutes.

Power Output Control

Figure 6:
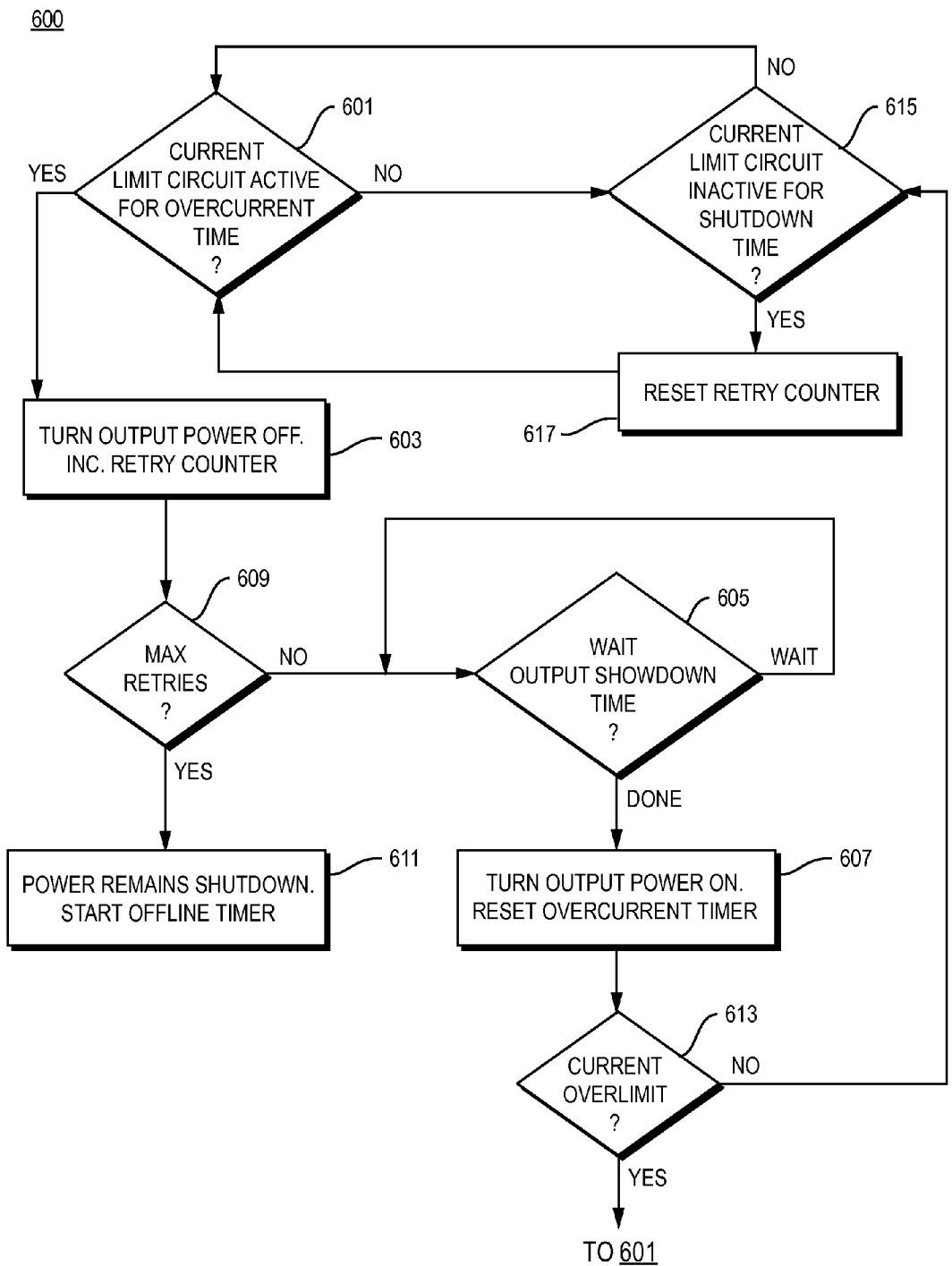
FIG. 6 is a flowchart of a power output control function

FIG. 6 is a flowchart 600 of a power output control function.

If a power output's current exceeds some predetermined threshold (Power Output Current Limit Active is active) for more than some corresponding time limit (Output Over Current Time) as determined in step 601, i.e., a sustained overcurrent condition has occurred, then within the Overcurrent and Retry parameters previously discussed the output is switched off and an Output Retry counter is incremented (step 603).

After the Output Shutdown Time (step 605), the Output Over Current Time timer is reset and the Power Output is turned back on (step 607). If the Power Output Current Limit remains Active for the Output Over Current Time (determined at step 613), the sequence repeats, until the Output Shutdown Maximum Retries is reached. Once the Output Shutdown Maximum Retries is reached (determined at step 609), the output remains shut down and the Output Shutdown Offline Time timer is started (step 611).

If, after the Power Output is turned on, the Power Output Current Limit Active input is inactive, i.e., there is no overcurrent condition, for more than the Output Shutdown Time (determined at step 615), the Output Retry counter is reset (step 617).

Figure 7:
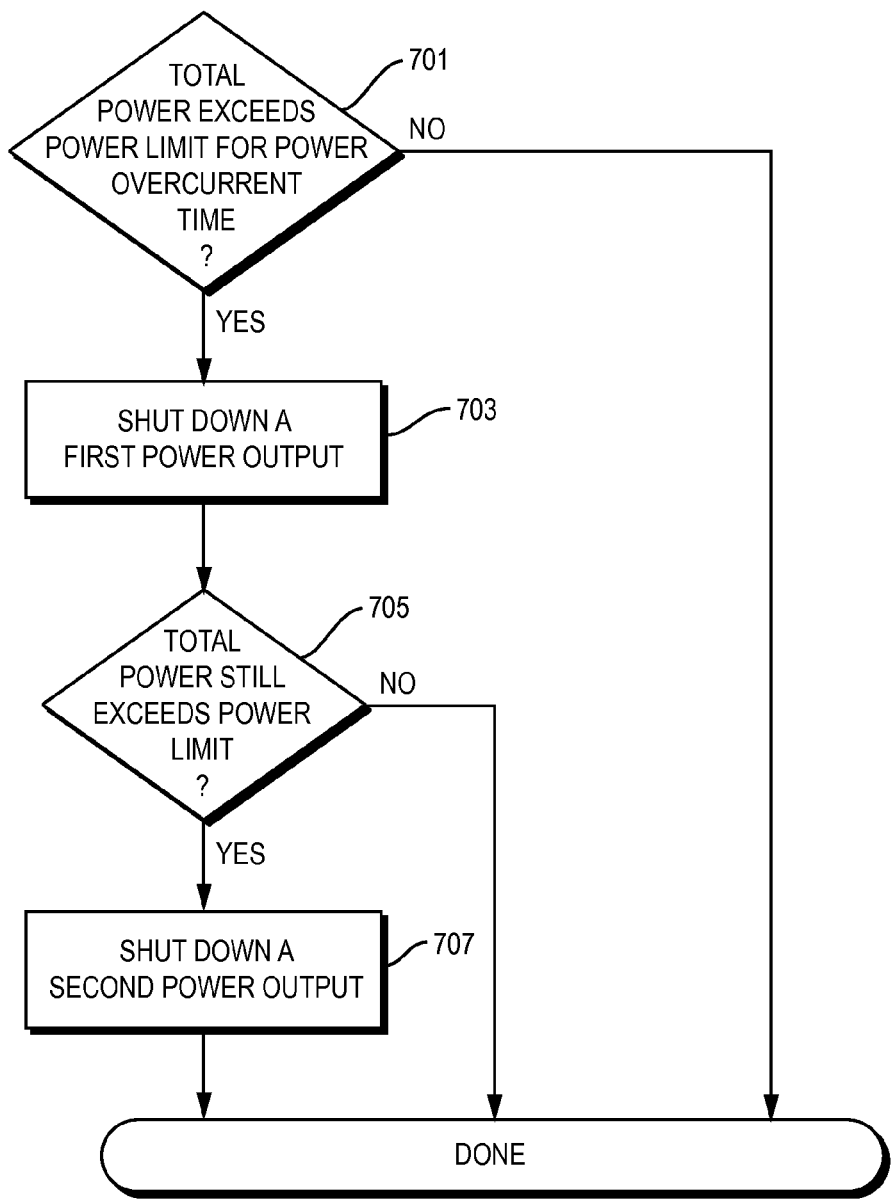
FIG. 7 is a flowchart of a power output shutdown/retry function according to an embodiment of the present invention.

FIG. 7 is a flowchart 700 of a power output shutdown/retry function according to an embodiment of the present invention.

The Power Output Shutdown/Retry function shown in FIG. 7 will be applied if the total power exceeds some maximum power, for example 160 watts. In this case, if the power limit is exceeded for the Power Over Current Time (determined in step 701), the power supply will preemptively shutdown one of the power outputs (step 703). If this does not reduce the power below the limit (determined at step 705), a second Power Output will be shutdown (step 707). The order in which the outputs are shut down may be configured by the user. The same shutdown time/retry parameters can apply to shutting down outputs due to exceeding maximum power.

In an embodiment, the current limits may be set to default values on reset of the power supply. The default current limits allow any output to supply the entire 160 W available. The current limits may be modified by means of the menu-based interface on the debug port. Outputs may be disabled/re-enabled via automatic control in response to the detection of overcurrent events, or via a physical SHUTDOWN pushbutton. The shutdown time/retry parameters and output priorities may also be modified by the menu based interface. Average and Peak Current values may be accessible via the menu.

Alternatively, individual outputs can be disabled/re-enabled by protocol command input, as will the other Power Output control parameters and measurements. Reporting of events and alarms may also be available via the communications protocol.

Figure 8:
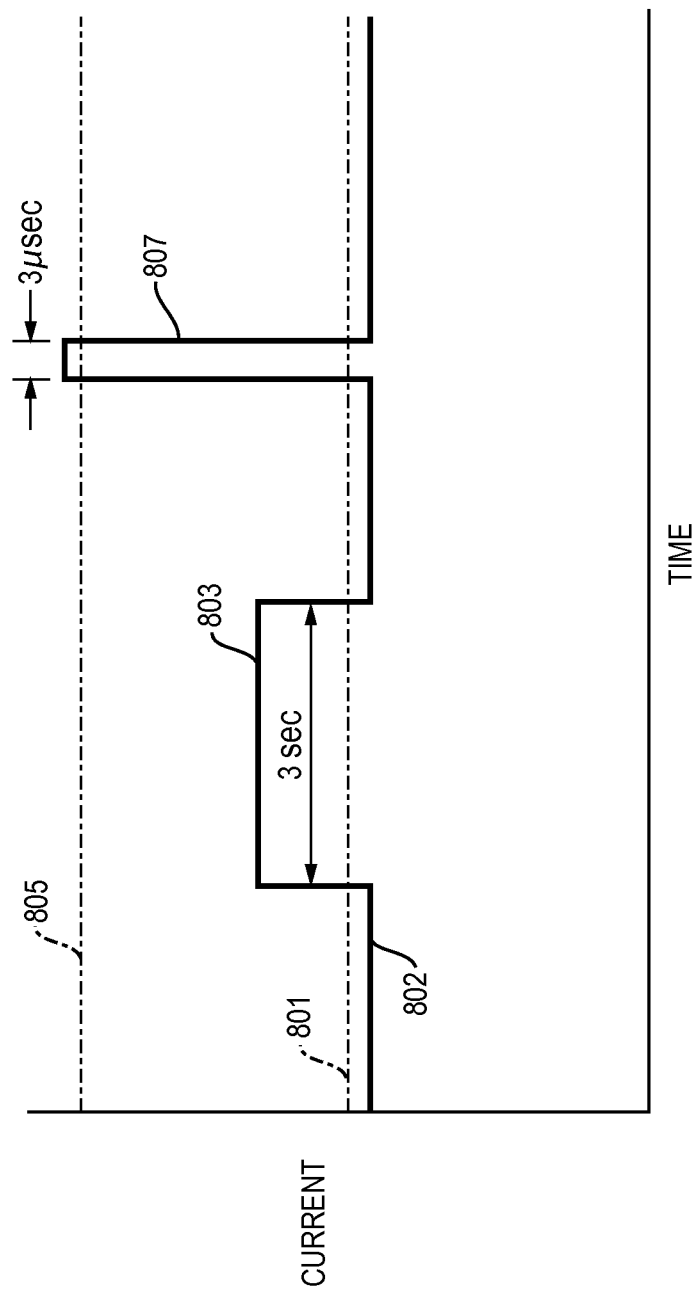
FIG. 8 is a graph which illustrates monitoring of a power output according to an embodiment of the present invention.

FIG. 8 is a graph which further illustrates monitoring of a power output. In this example, a representative power output current over time is designated by line 802. A threshold current level has been set at 801. At 803, the output current exceeds threshold 801 for 3 seconds. If the Power Over Current Time is set to, for example, 2.5 seconds, this output will be shut down (not shown).

Battery Charging and Management

A Battery Charging and Management servicing function 132 monitors various inputs and generates actions. Inputs include the battery charging current, battery terminal voltage, ambient temperature, and battery detection. For example, lead-acid batteries should not be charged below freezing or above 50° C. In addition, the charging profile may be controlled by ambient temperature. Batteries with other chemistries will have different requirements.

The battery terminal voltage may be measured 1) when the battery charger is enabled, in order to determine battery charge state; and 2) when the battery charger is disabled, in order to detect the presence of the battery.

When the ambient temperature rises above 70° C., an alarm message may be generated and/or logged. When the temperature is between 55° C. and 70° C., a warning may be generated and/or logged.

Battery Presence Detection: Periodically, and while AC is detected, the battery charger 132 will be disabled and the battery terminal voltage measured. If the voltage is below a threshold such as 8 volts, the battery may be considered to be absent.

Figure 5:
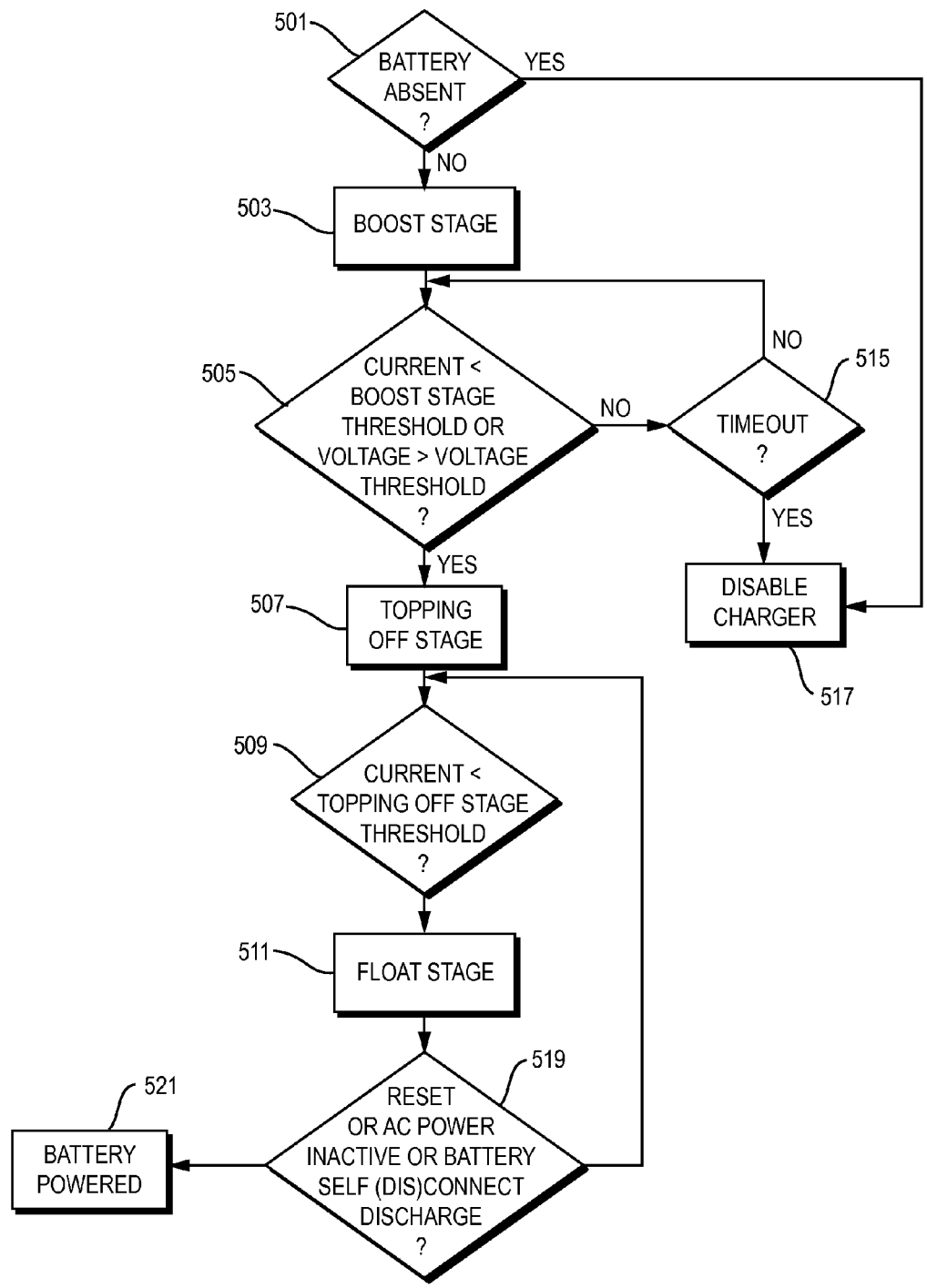
FIG. 5 is a flowchart of a battery charge scheme according to an embodiment of the present invention.

FIG. 5 is a flowchart 500 of a battery charge scheme according to an embodiment of the present invention.

If the battery has been determined to be absent (step 501), the battery charger is disabled.

When the battery is detected, a 3-stage charging algorithm is employed. The battery charge current is adjusted for ambient temperature, for example, in the temperature range of −15° C. to 50° C. The battery is not charged outside of this temperature range. The battery charging algorithm may include several parameters which may be set by the user. If no parameters are set by the user, default values are used. The charging parameters include (all given default values are for illustrative purposes only):

Boost Stage Charge Current: Maximum allowed battery charge current. Default: 3 Amps.

Boost Stage Maximum Time: Maximum time allowed for charging at the Boost Stage. Default: 16 hours.

Topping Stage Threshold Current: Threshold of charging current below which the battery charger will end the Topping Stage and enter the Float Stage. Default: 0.5 Amp.

Float Stage Current: Maximum allowed current during float stage. Default: 0.2 A.

The stages for charging the battery after A/C power restore or battery replacement are 1) Boost Stage; 2) Topping Stage; and 3) Float Stage.

Battery charging begins with the boost stage 503. The battery charger current limit is set to the Boost Stage Charge Current, and the Boost Stage Charge Timer is reset. The boost stage ends when, as determined at step 505 either 1) the Battery Charging Current drops below a threshold and/or the terminal voltage rises above a threshold indicating the battery can enter the Topping Stage; or 2) the battery charging current exceeds a current limit threshold after a Boost Stage Maximum duration has elapsed.

When the battery charging current does not exceed the current limit threshold, the battery charger then enters the Float Stage (step 507).

If, on the other hand, the Battery Charging Current Limit Active remains active after the Boost Stage Maximum Time has elapsed, the battery charger is disabled (step 517). Battery charging will not resume until a Processor Reset, a Battery Disconnect/Reconnect, or Factory Default Reset is initiated.

During Float Stage (step 507), the charge current may be periodically set to zero (the battery is disconnected from the charger) while the terminal voltage is measured. After the terminal voltage is measured the Float Stage current setting is restored. If the battery self-discharges below a threshold (Step 509), the algorithm progresses to the Topping Off State (Step 511).

While in Float Stage, the battery charger current limit is set to the Float Stage Current. The Float Stage may continue indefinitely, until either AC Power Present goes from Inactive to Active (AC power is lost), a Processor Reset, a Battery Disconnect/Reconnect, or a Factory Default Reset, any of which are determined at step 513. While AC power is lost the battery supplies power to the access control equipment and all charging is inactive. Following a Battery Disconnect all charging is inactive. Following Processor Reset, Battery Reconnect, and a Factory Default Reset charging resumes from the Boost Stage.

During Float Stage, if the battery terminal voltage (with charger momentarily turned off) is detected to be above 13.2 V, the battery is determined to be in normal condition.

Battery Switch-Over and Discharge

Switch-over to battery after AC power fails is performed automatically by hardware. However, firmware is able to detect this occurrence by monitoring the AC Present circuitry. When switch-over to battery is detected, a timer is started so that battery run-time running may be reported. The Battery Charger is disabled when the system is powered by battery. The battery terminal voltage is monitored, and if the battery voltage is below 10.8 V, the battery is determined to be low. When the battery terminal voltage drops below 10.2 V, the battery current is cut off (turning off all internal and external power) to prevent deep-discharge of the battery.

Battery Test Schedule

A Battery Test Schedule feature may be provided to allow a user to schedule regular testing of the battery backup system by disconnecting the AC input and allowing the power supply to operate off from the batteries. The Battery Test Schedule feature may be available only when a real-time clock (not shown) has been set. The Battery Test Schedule operates with the following parameters: Battery Test Enable; Battery Test Frequency; Battery Test Time; Battery Test Day; and Battery Test Length. Default values are provided for illustrative purposes.

Battery Test Enable: The Battery Load Test Schedule feature is enable when this is set to True. Default: False.

Battery Test Frequency: The frequency at which the Battery Test will be scheduled. May be set, for example, to Daily, Weekly, or Monthly. Default: Weekly.

Battery Test Time: Time of day that the Battery Test is scheduled to occur. Default: 12:00 am.

Battery Test Day: The day that the Battery Test is scheduled to occur. If Battery Test Frequency is set to Weekly, the day may be set to any of the days of the week. If the frequency is set to Monthly, Battery Test Day may be set to day of month. To address the issue of months having different numbers of days, the day on month may, for example, be limited to values in the range of 1-28. Default: Sunday.

Battery Test Length: Length of time to perform Battery Test. Default: 10 min.

Battery Test Processing

The Battery Test will be performed at the time and day scheduled, but only if the battery test is enabled A/C is detected, and a battery is present.

Battery Test is performed by setting the AC Power Disable output to Active. The Battery Test timer is reset. A Battery Test Active change of state to Active message is sent to the Event Processor. After a time of Battery Test Length has transpired, the AC Power Disable output is set to Inactive, and a Battery Test Active change of state to Inactive message is sent to the Event Processor.

Battery Service Warning

A Battery Service Life parameter defines the service life of the battery before it must be replaced. An exemplary default value is 2 years. A user can mark the time and date a battery has been replaced. The time that the battery has been in service is measured with the Real Time Clock from the time/date of battery replacement.

The battery should be serviced a set time after installation. To this end, a service timer is maintained. This set time (Battery Service Time) can change due to the performance of the battery on the previous charge cycle. The Battery Service Time and a Battery Service Warning may be available via the debug port. Alternatively, a user may be allowed to mark the time/date of battery replacement through a host (such as CCURE) to the Control Panel, and the Control Panel may relay this action to the power supply, for example, via an RS-485 protocol command. After the Battery Service Life has transpired, the power supply may send a warning message to the Panel, and this message will be relayed by the Control Panel to the host.

Note that the control panel must periodically update the current time and date in the power supply to correct for drift in the pseudo-RTC, and also to restore the time date in the pseudo-RTC in case of power failure. Other ways of synchronizing the pseudo-RTC may also be available.

Shutdown Function

The processor supports an orderly shutdown, including sequential disabling of battery charging and power outputs. This feature can be initiated either by a switch or a command. The switch input may involve an interlock, in which case several inputs states may need to be monitored. In addition to a processor Reset button, a SHUTDOWN button may allow access to the shutdown features, such as: Processor Reset; Battery Disconnect; Output Disconnect; and Factory Default Reset.

Processor Reset requires settings to be maintained when the processor is reset. After a reset, the processor explicitly sets the current limiting hardware to their previously set values, in a manner that prevents an interruption to the output current (if hardware allows). The processor may store event logs in a non-volatile memory to ensure that the logs are maintained through a reset. The event log may be stored in a first-in first-out format, and may be transactioned to ensure that entire records are integral.

The Battery Disconnect function monitors the SHUTDOWN button. When the button is pressed continuously for some period (e.g., more than 2 seconds), the processor toggles the battery charger on or off (depending on the prior state). The button must be released and re-pressed to toggle the battery charger back to its original state. When the battery charger is turned on or off, a message with the new Battery Charger State will be sent to the Event processor with a priority of Normal. Note that if all power outputs have been turned off, then the battery charger will also be turned off, and cannot be turned back on by pressing the Shutdown button.

Output Disconnect: If the SHUTDOWN button was first detected as not pressed (was not pressed during reset), and then is detected to be pressed continuously for more than an extended period, for example five seconds, the processor will turn off all outputs, including the battery charger output. Messages are sent to the Event Processor for the new Power Output State and Battery Charge State with a priority of Normal. Note that the power supply processor must be reset (or the power cycled) to turn the outputs back on.

Factory Default Reset: When the SHUTDOWN button is detected to be pressed immediately after a hard reset, and the button remains pressed for a period of at least, say five seconds, the processor will reset all settings (current limits, timers, counters, etc.). However, the event log will not be cleared.

During the time immediately after reset and when it has been determined that the SHUTDOWN button has been pressed for some period such as 5 seconds, the power supply will perform as normal from a hard reset. During the resetting of default values, the outputs will be shut down for, say, one second and the corresponding LEDs will be turned off. After another interval, for example one second, the outputs will be re-enabled (with their factory default values), and the LEDs will be re-lit to reflect the state of the outputs.

The invention claimed is:

1. A multi-output power supply, comprising:
   an input power port for receiving input power;
   a first output power port supplying a first voltage derived from the input power that powers a control panel;
   a second output power port supplying a second voltage derived from the input power that powers door locks;
   a first shut-down circuit configured to shut down the first output power port, independently of the second output power port, if power drawn from the first output power port exceeds a first predetermined value;
   a second shut-down circuit configured to shut down the second output power port, independently of the first output power port, if power drawn from the second output power port exceeds a second predetermined value; and
   a controller that monitors first indication signals and second indication signals indicating whether the first output power port and the second output power port, respectively, are shut down.

2. The power supply of claim 1, wherein the shut-down circuit is further configured to shut down the first output power port only when the power draw exceeds the first predetermined value for at least a first predetermined length of time and wherein the second shut-down circuit is further configured to shut down the second output power port only when the power draw exceeds the second predetermined value for at least a second predetermined length of time.

3. The power supply of claim 1 wherein the first and second voltages are different.

4. The power supply of claim 3, further comprising:
   a backup battery bank supplying only the first voltage; and
   a converter which converts the battery bank's single voltage to the second voltage, both the first and second voltages being supplied to the first and second output power ports when the input power fails.

5. The power supply of claim 1, further comprising a monitoring circuit which monitors power draw on the first output power port.

6. The power supply of claim 5, the monitoring circuit comprising:
   a measurement circuit which measures current draw of the first output power port; and
   a comparator circuit which compares the current draw with a current limit set point.

7. The power supply of claim 6, the shut-down circuit comprising:
   a switch that shuts down the first output power port if said port's associated current draw exceeds the current limit set point, while the second output power port continues to provide power.

8. The power supply of claim 7 further comprising:
a delay causing the switch to provide power after shutting down for a predetermined period.

9. The power supply of claim 8 wherein the delay circuit will not cause the switch to provide power after a predetermined number of restarts.

10. The power supply of claim 1, further comprising:
at least a third power output port which is monitored and configured to shut down independently of all other power output ports when its power draw exceeds a respective predetermined limit.

11. The power supply of claim 1, wherein the controller sets the first predetermined value and the second predetermined value.

12. The power supply of claim 1, wherein the first voltage is 12 Volts and the second voltage is 24 Volts.

13. The power supply of claim 1, further comprising a first monitoring circuit which monitors power draw on the first output power port and a second monitoring circuit which monitors power draw on the second output power port, wherein the first monitoring circuit comprises:
a first measurement circuit which measures current draw of the first output power port; and
a first comparator circuit which compares the current draw with a first current limit set point provided by the controller;
wherein the second monitoring circuit comprises
a second measurement circuit which measures current draw of the second output power port; and
a second comparator circuit which compares the current draw with a second current limit set point provided by the controller.

14. The power supply of claim 13, the shut-down circuit comprising:
a first switch that shuts down the first output power port if said port's associated current draw exceeds the first current limit set point, while the second output power port continues to provide power; and
a second switch that shuts down the second output power port if said port's associated current draw exceeds the second current limit set point, while the first output power port continues to provide power.

15. The power supply of claim 14 further comprising:
a first delay circuit for causing the first switch to provide power after shutting down for a predetermined period; and
a second delay circuit for causing the second switch to provide power after shutting down for a predetermined period.

16. The power supply of claim 1, wherein the controller monitors and maintains a listing of logged events.

17. The power supply of claim 1, further comprising an output retry counter that is incremented when the first output power port is shut down, wherein if the output retry counter has not reached an output shutdown maximum number of retries, the first output power port is turned back on after an output shutdown time, or wherein if the output retry counter has reached the output shutdown maximum number of retries, the first output power port remains shut down.

18. A method for supplying multi-output power, comprising:
receiving input power;
via a first output power port, supplying a first voltage derived from the input power to a power control panel;
via a second output power port, supplying a second voltage derived from the input power to power door locks;
shutting down the first output power port, independently of the second output power port, if power drawn from the first output power port exceeds a first predetermined value for a first predetermined length of time; and
monitoring and reporting whether the first output power port and the second output power port are shut down.

19. A multi-output power supply, comprising:
an enclosure with an access door;
a power supply contained within the enclosure; and
a superbright LED contained within the enclosure, said superbright LED indicating a status of the power supply and being visible externally through a dimming filter when the access door is closed, such that when the access door is opened, the brightness of the superbright LED is substantially lessened.

20. A power supply, comprising:
a first output power port, supplying a first voltage derived from the input power to power a control panel;
a second output power port, supplying a second voltage derived from the input power to power door locks;
means for determining if power drawn from the first output power port exceeds a predetermined value for a predetermined length of time;
means for shutting down the first output power port, independently of the second output power port, if power drawn from the first output power port exceeds the predetermined value for the predetermined length of time; and
means for monitoring and reporting whether the first output power port is shut down.

\* \* \* \* \*